United States Patent [19]
Yeaglin

[11] Patent Number: 5,802,654
[45] Date of Patent: Sep. 8, 1998

[54] SNOW AND ICE REMOVER FOR VEHICLE ROOFS

[76] Inventor: William E. Yeaglin, 966 Wood St., Mount Joy, Pa. 17552

[21] Appl. No.: 909,359

[22] Filed: Aug. 11, 1997

[51] Int. Cl.$^6$ ....................................................... B60S 3/04
[52] U.S. Cl. ........................................ 15/97.3; 15/DIG. 2
[58] Field of Search ................................ 15/97.3, DIG. 2

[56] References Cited

U.S. PATENT DOCUMENTS

| | | |
|---|---|---|
| 1,411,949 | 4/1922 | Wilson . |
| 1,492,894 | 5/1924 | Perego . |
| 1,611,273 | 12/1926 | Kelso . |
| 1,864,821 | 6/1932 | Heuze . |
| 2,215,692 | 9/1940 | Fleming . |
| 3,104,406 | 9/1963 | Rhodes . |
| 3,439,372 | 4/1969 | Collier . |
| 5,450,815 | 9/1995 | Krehl et al. . |

*Primary Examiner*—Randall Chin
*Attorney, Agent, or Firm*—Martin Fruitman

[57] ABSTRACT

The apparatus is a snow and ice remover for the roofs of trucks and trailers. A bridge like structure of two vertical beams and an upper cross piece supports a vertically adjustable snow plow assembly which rolls on wheels riding on the vertical beams. A wedge shaped plow forms the lower edge of the snow plow assembly so that when a snow or ice covered truck or trailer moves under the properly positioned plow, the snow or ice is pushed off the top of the vehicle. The snow plow has a minimum height below which it can not be lowered, and the adjustment of the snow plow is powered by a winch on the cross beam which reels in or releases a chain from which the snow plow is hung.

10 Claims, 1 Drawing Sheet

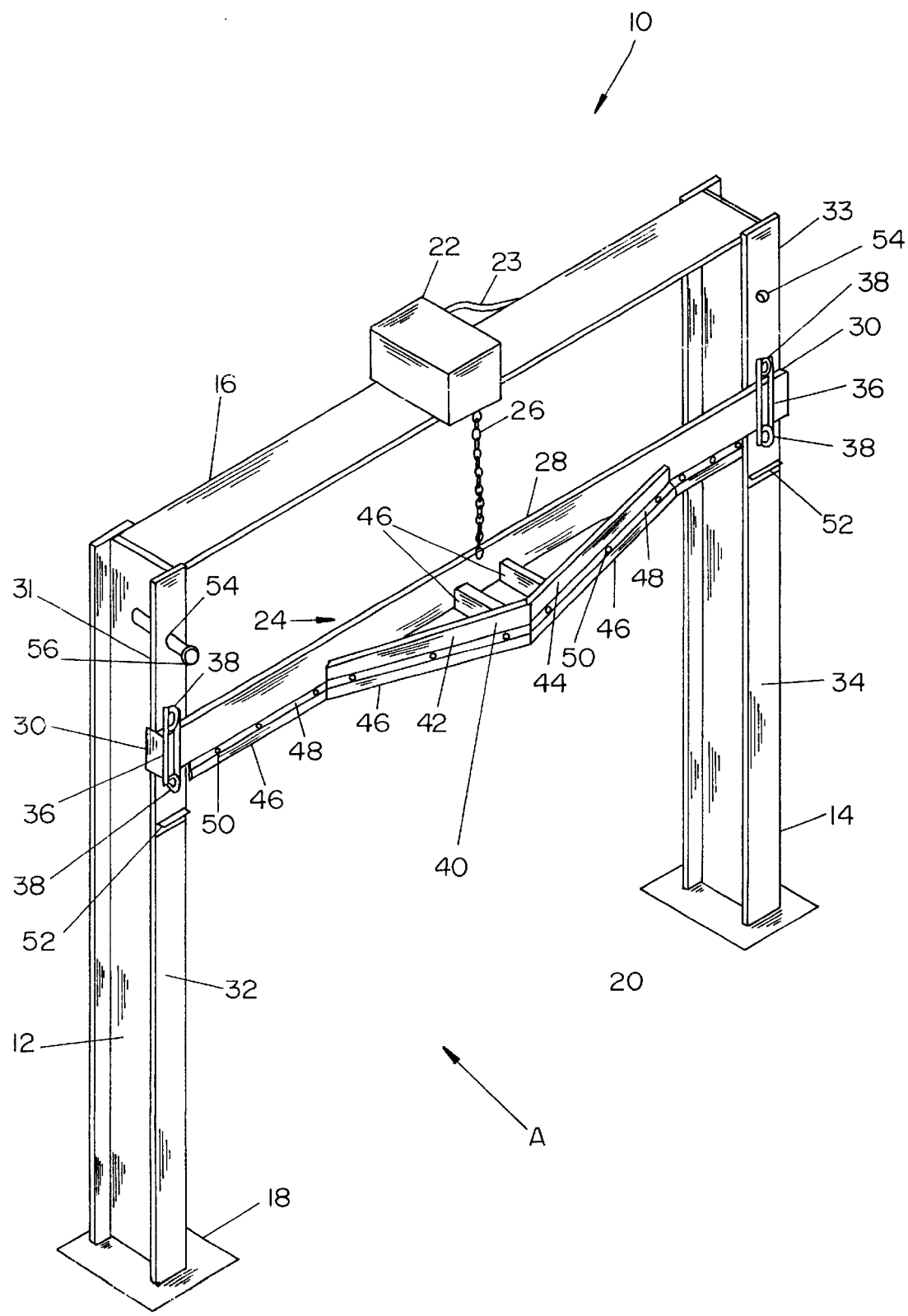

SNOW AND ICE REMOVER FOR VEHICLE ROOFS

BACKGROUND OF THE INVENTION

This invention deals generally with brushing and cleaning and more specifically with cleaning snow and ice from the roofs of vehicles.

It is not an uncommon experience in localities which experience significant snowfall to see a slab of snow fly off the roof of a passenger car or van and strike a following vehicle. Regardless of the vehicle from which the snow is released, the experience is startling to the driver behind. However, if the snow is from atop a large semi-trailer, and particularly if it has been hardened into ice, the event can be very dangerous.

This has always been a concern of the trucking industry. Therefore, trucking companies spend considerable money to clear snow and ice from the roofs of trailers after every major snow storm. This effort not only takes money but also requires significant time, so that the operation of the trucks of a large fleet can be delayed significantly after a snowstorm. Furthermore, since the snow and ice removal has always been done manually by workers shoveling from atop the trailers, employers and insurance companies are very concerned about the danger of such workers slipping and falling from the typically 13 foot high trailer roofs.

Yet, until now, the truckers have had no choice. Not only does snow and ice atop a trailer pose a threat to the public, but now at least one state, N.J., requires that such roof snow and ice be cleared before a truck moves onto a public road. Furthermore, even without such requirements, there is a significant increase in fuel consumption, and therefore an increase in the cost of operation, if snow or ice is not removed.

SUMMARY OF THE INVENTION

The present invention offers a solution to the dilemma of the conflicting dangers involved in both removing snow and ice or not removing them.

The invention is a snow plow for the roofs of trucks and trailers which functions by having the vehicle move under the the snow plow which is held stationary. The apparatus of the invention is a bridge like structure with two vertical "I" beams and an upper cross piece which is used to support a vertically adjustable bar. The adjustable bar rolls vertically on wheels riding on the flat surfaces of the two vertical beams and is guided by "L" shaped structures on the end of the adjustable bar which wrap around the vertical outer edges of the "I" beams. The adjustable beam has a wedge shaped plow formed on its lower edge to which is attached a stiff rubber blade, so that when a snow or ice covered truck or trailer moves under the properly positioned plow, the snow or ice is pushed off the top of the vehicle and onto the ground.

The adjustable bar is prevented from being lowered below a prescribed minimum height by stops attached to both vertical "I" beams so that the snow plow cannot damage a trailer by being set too low. In the preferred embodiment raising the plow bar is accomplished by a winch on the upper cross piece which reels in a chain from which the plow bar is hung. To lower the plow bar the winch is released and braked and the chain is pulled out slowly by the weight of the plow bar.

A truck or trailer need only be moved slowly under the snow plow, after the snow plow is set at an appropriate height, in order to remove all the snow and ice from atop the trailer. Typically, this action takes just a minute or so for every trailer, and one height setting is usually satisfactory for all the trailers in a fleet. Thus, an entire fleet of trailers can be cleared by only one or two workers in the time it previously took to clear only one trailer, and there is no danger to any workers.

BRIEF DESCRIPTION OF THE DRAWING

The FIGURE is a perspective view of the preferred embodiment of the invention.

DETAILED DESCRIPTION OF THE INVENTION

The FIGURE is a perspective view of the preferred embodiment of the invention in which snow and ice remover 10 is constructed with "I" beams 12 and 14 and upper cross piece 16 forming an overhead bridge structure. In the preferred embodiment, "I" beams 12 and 14 are of equal height, parallel, extend approximately twenty feet above ground and eight feet underground, and are anchored in the ground with appropriate footers 18 and 20. They are also separated by a distance sufficient to easily move a typical semi-trailer between them.

It should be appreciated that upper cross piece 16 is not needed to separate beams 12 and 14 which are each free standing. The function of upper cross piece 16 is to support winch 22, from which snow plow assembly 24 is supported by chain 26. It should also be understood that if an adjustable installation is not needed, snow plow assembly 24 can be permanently attached to beams 12 and 14 at a height appropriate to move a vehicle under snow plow 24.

Winch 22 is a conventional electrically powered winch which is powered and controlled through cable 23. Cable 23 follows the structure of upper cross piece 16 and either beam 12 or 14 to a conventional control station (not shown) at ground level from which an operator can operate winch 22 to raise or lower snow plow assembly 24.

Snow plow assembly 24 is constructed with crossbar 28 captured between beams 12 and 14 by "L" shaped fixtures 30 attached to the ends of crossbar 28 and wrapped around outer edges 31 and 33 of flanges 32 and 34 of "I" beams 12 and 14, respectively. Crossbar 28 is spaced from beam flanges 32 and 34 by wheel assemblies 36. Each wheel assembly includes two wheels 38 located in line, spaced apart, and located at opposite edges of crossbar 28, so that crossbar 28 can roll along flanges 32 and 34 and maintain its original spacing from the flanges as it is raised and lowered by winch 22.

The part of the snow and ice remover 10 which actually contacts snow and ice is snow plow 40. Snow plow 40 is shaped as a wedge with two angled sections 42 and 44 meeting in the center of snow plow 40. To better resist the force of the snow being pushed off the vehicle, braces 46 are attached to angled sections 42 and 44 and to crossbar 28.

To protect the surfaces of the roofs of the trucks or trailers being cleared of snow and ice, protective strip 46 is clamped to the lower edge of snow plow 40 and extends across its entire length. Protective strip 46 is clamped to snow plow 40 by the conventional means of flat holding strip 48 and clamping bolts 50. In the preferred embodiment, protective strip 46 is a flat strip of rubber which is 8 inches high and one inch thick.

Another feature used to protect the vehicle being cleared of snow or ice is the use of lower stops 52. Lower stops 52 are attached to beams 12 and 14 at a height appropriate for the vehicles being cleared by a particular snow and ice remover 10, so that no vehicle can be driven under snow and ice remover 10 and be damaged by snow plow 40. Stops 52 are typically installed 13 feet above the ground but clearly could be installed at different heights, and could also be attached using bolts, so that their heights could occasionally be changed.

Upper stop holes 54 are located on beams 12 and 14 just below cross piece 16 and are also used for safety purposes. When snow and ice remover 10 is taken out of service for long periods of time, for instance during summer, plow assembly 24 can be raised to its maximum height and support pins 56 (only one shown) inserted through upper stop holes 54. This arrangement supports plow assembly 24 and takes the weight off of chain 26 while plow assembly 24 is high above any truck or trailer roofs.

The operation of snow and ice remover 10 is quite straightforward. Once the working height of snow plow 40 is set by the use of winch 22, all that is required is that a vehicle be slowly driven under snow and ice remover 10 in the direction indicated by arrow A. Since all that is needed is relative motion between snow plow 40 and the roof of the vehicle, it is immaterial that the vehicle is in motion rather than the snow plow, so snow and ice will be pushed off the roof and over the sides and rear of the vehicle. It should be appreciated that even with a trailer moving at only one mile per hour, it will take less than a minute to clear the roof of a typical trailer.

The present invention therefore provides an inexpensive, rapid, and safe way to clear snow and ice from truck and trailer roofs. In fact, it is estimated that only one typical winter's snowfall is needed to pay for the installation of the invention for most trailer fleets.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, snow plow 40 can be constructed with various heights to accommodate to the weather of different regions, it could be constructed with a single angled blade so that snow and ice are pushed off only one side of the vehicle, or it can be constructed with a curved surface at the upper edge to deflect snow and ice downward to assure they do not go over the top of the plow. Moreover, protective strip 46 can also be made of plastic or any other material which will not damage the roof surface.

What is claimed as new and for which Letters patent of the United States are desired to be secured is:

1. A snow and ice remover for vehicles comprising:

two vertical supports separated by a distance sufficient to move a vehicle between the vertical supports; and a snow plow attached to the vertical supports and located at a height which permits a vehicle to be moved under the snow plow while snow and ice on the roof of the vehicle is pushed off of the vehicle.

2. The snow and ice remover of claim 1 wherein the snow plow is attached to the vertical supports by moving means which permit the snow plow to be adjusted vertically along the vertical supports.

3. The snow and ice remover of claim 2 further including a cross support attached to the vertical supports and spanning the distance separating the vertical supports, the cross support being located at a height above the snow plow and supporting a winch from which the snow plow is suspended, so that the winch can raise and lower the snow plow.

4. The snow and ice remover of claim 2 wherein the moving means is a rolling means attached to the snow plow and contacting a surface on each vertical support.

5. The snow and ice remover of claim 4 further including a fixture which wraps around an edge on each vertical support to guide the snow plow as it is adjusted vertically.

6. The snow and ice remover of claim 2 further including lower vertical stop means which prevent the snow plow from moving below a predetermined height.

7. The snow and ice remover of claim 2 further including removable upper stop means which can support the snow plow above the lowest point of its movement.

8. The snow and ice remover of claim 1 wherein the snow plow includes a material which will not damage a vehicle roof and the material is attached to the snow plow at a location of contact with a vehicle moved under the snow plow.

9. The snow and ice remover of claim 1 wherein the snow plow is constructed with two sections which meet at an angle at the center of the snow plow.

10. The snow and ice remover of claim 1 wherein the vertical supports are free standing "I" beams imbedded in the ground.

\* \* \* \* \*